(12) United States Patent
Dombrowski et al.

(10) Patent No.: US 7,783,835 B2
(45) Date of Patent: *Aug. 24, 2010

(54) SYSTEM AND METHOD OF IMPROVING TASK SWITCHING AND PAGE TRANSLATION PERFORMANCE UTILIZING A MULTILEVEL TRANSLATION LOOKASIDE BUFFER

(75) Inventors: Chris Dombrowski, Cary, NC (US); Marcus Lathan Kornegay, Morrisville, NC (US); Douglas Michael Pase, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 55 days.

This patent is subject to a terminal disclaimer.

(21) Appl. No.: 12/101,728

(22) Filed: Apr. 11, 2008

(65) Prior Publication Data
US 2008/0215815 A1    Sep. 4, 2008

Related U.S. Application Data

(63) Continuation of application No. 11/095,052, filed on Mar. 31, 2005, now Pat. No. 7,386,669.

(51) Int. Cl.
*G06F 12/00* (2006.01)

(52) U.S. Cl. ............ 711/122; 711/118; 711/135; 711/206; 711/E12.024; 711/E12.061; 718/107; 718/108

(58) Field of Classification Search .............. None
See application file for complete search history.

(56) References Cited

U.S. PATENT DOCUMENTS

| | | | |
|---|---|---|---|
| 6,356,989 B1 * | 3/2002 | Hays et al. | 711/205 |
| 6,606,697 B1 * | 8/2003 | Kawahara et al. | 711/207 |
| 7,386,669 B2 * | 6/2008 | Dombrowski et al. | 711/122 |

* cited by examiner

*Primary Examiner*—Reginald G Bragdon
*Assistant Examiner*—Shawn X Gu
(74) *Attorney, Agent, or Firm*—Cynthia G. Seal; Law Office of Jim Boice

(57) ABSTRACT

A system and method of improved task switching in a data processing system. First, a first-level cache memory casts out an invalidated page table entry and an associated first page directory base address to a second-level cache memory. Then, the second-level cache memory determines if a task switch has occurred. If a task switch has not occurred, first-level cache memory sends the invalidated page table entry to a current running task directory. If a task switch has occurred, first-level cache memory loads from the second-level cache directory a collection of page table entries related to a new task to enable improved task switching without requiring access to a page table stored in main memory to retrieve the collection of page table entries.

24 Claims, 6 Drawing Sheets

SYSTEM AND METHOD OF IMPROVING TASK SWITCHING AND PAGE TRANSLATION PERFORMANCE UTILIZING A MULTILEVEL TRANSLATION LOOKASIDE BUFFER

The present application is a continuation of U.S. patent application Ser. No. 11/095,052, now U.S. Pat. No. 7,386,669, filed on Mar. 31, 2005 and issued on Jun. 10, 2008, entitled "System and Method of Improving Task Switching and Page Translation Performance Utilizing a Multi-Level Translation Lookaside Buffer". Applicants claim benefit of priority under 35 U.S.C. §120 to U.S. Pat. No. 7,386,669, which is incorporated by reference herein in its entirety and for all purposes.

BACKGROUND OF THE INVENTION

1. Technical Field

The present invention relates in general to data processing systems, and more specifically, the present invention relates to handling translations within a data processing system. Still more particularly, the present invention relates to improving data processing system performance utilizing a translation lookaside buffer.

2. Description of the Related Art

Modern data processing systems typically utilize a virtual memory system to address very large amounts of memory, even thought the main memory of the system encompasses a much smaller address space. Typically, memories with small storage capacities (e.g., caches) have quicker access times. Accordingly, memories with large storage capacities (e.g., hard disk drive) have slower access times. Therefore, virtual memory systems present the illusion of a very large available system memory by storing frequently accessed data in caches and main memory. The virtual memory system stores less-frequently accessed data in the hard disk drive and retrieves the data only when needed. Therefore, since an access to the hard disk drive would result in a large performance penalty due to the slow access times of a hard disk drive, a virtual memory system where frequently-accessed data is stored in cache or main memory improves data processing system performance.

To facilitate the retrieval and access of data, virtual memory systems typically define discrete memory units such as pages or segments that include both virtual memory addresses and a corresponding physical memory address. The actual physical memory address may point to a location in a cache, main memory, or a slower alternate memory, such as the hard disk drive. If the physical address of the requested data is in a cache or main memory, the data is easily and quickly accessed and utilized. If, however, the physical address indicates that the page is located in an alternate memory location, such as a hard disk drive, the page must be transferred and "swapped" to main memory, where the data can then be accessed. This transfer typically requires that other data located in the cache or main memory be transferred out of the cache or main memory back to the hard disk drive in order to free up enough memory for storage of the newly-retrieved data. Transfers between levels of the memory hierarchy are typically controlled by a memory management unit.

The paging process requires a data structure, typically called a page table, that indexes the different pages handled by the data processing system. A typical page table is usually indexed by virtual page numbers, the size of the tables, the number of pages, and the virtual address space. Page tables are usually very large and are stored in main memory and are often paged. Accordingly, if a processor in a data processing system requests access to data stored in main memory, the processor must first refer to a page table located in memory to determine the physical address of the requested data. Then, the processor must access the main memory again to perform the actual data retrieval.

Those with skill in this art will appreciate that a method of minimizing the cost of main memory access time is to cache recently-accessed translations so that the mapping process is skipped if the current address references the same page as a recently accessed address reference. Typically, the last translation is saved in a special translation cache, usually known to those skilled in this art as a translation lookaside buffer (TLB). A TLB entry, also called a page table entry (PTE), typically includes multiple fields such as: a virtual address, a physical page frame number, protection fields, use bits, and a modified or dirty bit.

However, traditional translation lookaside buffers store page table entries which correspond only to the current task being executed by the data processing system. When a task switch occurs, the entire translation lookaside buffer must be flushed (e.g., invalidated) in order to store the page table entries for the new task. After the invalidation of the translation lookaside buffer for the new task, subsequent memory accesses to the page table to refresh the translation lookaside buffer consume many clock cycles and have a negative impact on the performance of the data processing system. Therefore, there is need for a system and method of providingaccess to recently-accessed page table entries and improving task switching performance in a data processing system.

SUMMARY OF THE INVENTION

A system and method of improved task switching in a data processing system are disclosed. First, a first-level cache memory casts out an invalidated page table entry and an associated first page directory base address to a second-level cache memory. Then, the second-level cache memory determines if a task switch has occurred. If a task switch has not occurred, first-level cache memory sends the invalidated page table entry to a current running task directory. If a task switch has occurred, first-level cache memory loads from the second-level cache directory a collection of page table entries related to a new task to enable improved task switching without requiring access to a page table stored in main memory to retrieve the collection of page table entries.

These and other features and advantages of the present invention will be described in, or will become apparent to those of ordinary skill in the art in view of the following detailed description of the preferred embodiments.

BRIEF DESCRIPTION OF THE FIGURES

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

The present invention discloses a system and method of improved task switching in a data processing system. To facilitate effective-to-physical address translations that enable components of a data processing system to directly access memory locations, recently-accessed page table entries are stored on local cache, usually referred to as a translation lookaside buffer (TLB). In a preferred embodiment of the present invention, the TLB includes two-parts, a first and second-level TLB. The second-level TLB is subsequently divided further into a task switch directory and a current running task directory.

As characteristic of all memory devices, the TLB contains a limited amount of memory. When filled to capacity, the first-level TLB will evict an older page table entry to free memory for a new page table entry. This eviction process is facilitated by a least-recently used or similar algorithm.

When a page table entry is evicted, the second-level TLB must determine if the eviction was a result of a task switch or merely due to the TLB becoming full. If the eviction was caused by a task switch, the task switch directory will be searched to determine whether or not the task switch directory includes a page directory base address and associated page table entries corresponding to the newly-switched task.

Also, if the second-level TLB has determined that a task switch did not occur, the evicted page table entry would merely be shifted to the current running task directory.

Figure 1:
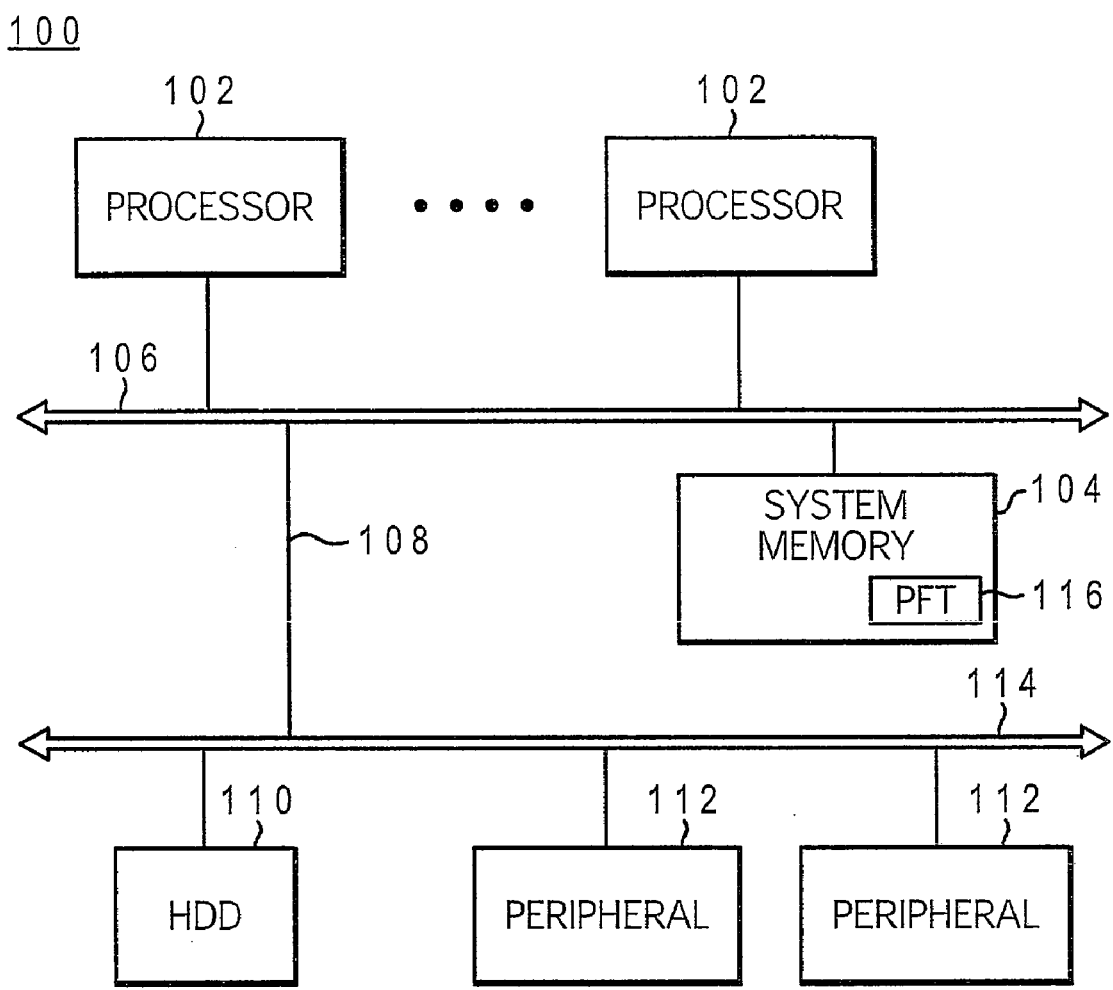
FIG. 1 is a block diagram depicting an exemplary data processing system in which a preferred embodiment of the present invention may be implemented.

With reference now to the figures and in particular, with reference to FIG. 1, there is depicted a block diagram illustrating an exemplary data processing system 100 in which a preferred embodiment of the present invention may be implemented. Exemplary data processing system 100 may be implemented on a general purpose computer, such as one of the members of the IBM-compatible family of computers, or one of several workstation or graphics computer devices which are presently commercially available.

As depicted, exemplary data processing system 100 includes processor(s) 102, which are coupled to system memory 104 via system bus 106. Preferably, system memory 104 may be implemented as a collection of dynamic random access memory (DRAM) modules. Typically, system memory 104 includes data, instructions, and a page frame table (PFT) 116, which will be discussed further in more detail in conjunction with FIGS. 3 and 4A-4C. Mezzanine bus 108 acts as an intermediary between system bus 106 and peripheral bus 114. Those with skill in this art will appreciate that peripheral bus 114 may be implemented as a peripheral component interconnect (PCI), accelerated graphics port (AGP), or any other peripheral bus. Coupled to peripheral bus 114 is hard disk drive 110, which is utilized by data processing system 100 as a mass storage device. Also coupled to peripheral bus 114 are a collection of peripherals 112.

Those skilled in the art will appreciate that data processing system 100 can include many additional components not specifically illustrated in FIG. 1. Because such additional components are not necessary for an understanding of the present invention, they are not illustrated in FIG. 1 or discussed further herein. It should also be understood, however, that the enhancements to data processing system 100 to improve task switching and page translation performance provided by the present invention are applicable to data processing systems of any system architecture and are in no way limited to the generalized multi-processor architecture or symmetric multi-processing (SMP) architecture illustrated in FIG. 1.

Figure 2:
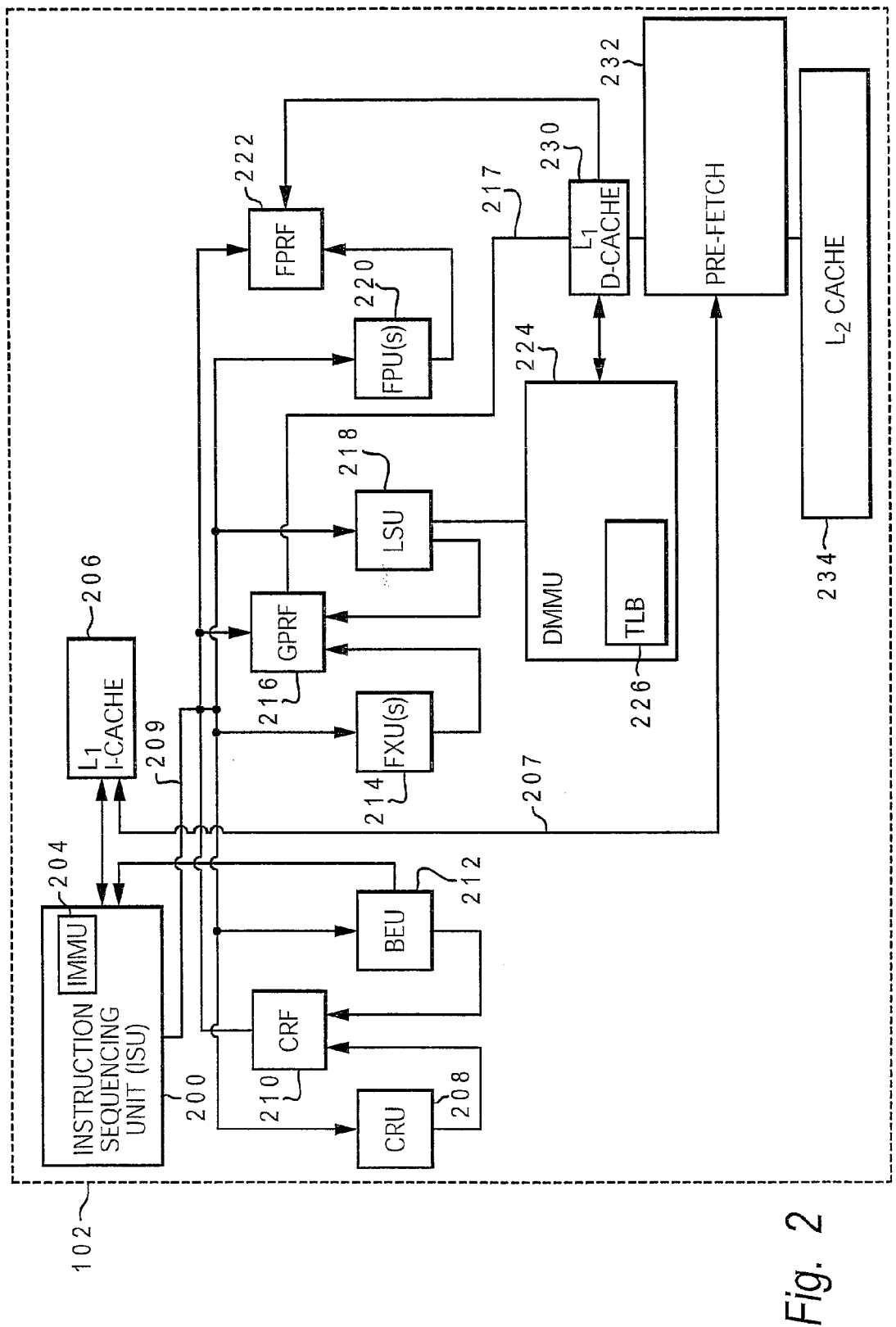
FIG. 2 is a detailed block diagram illustrating a processor in an exemplary data processing system in which a preferred embodiment of the present invention may be implemented.

Referring now to FIG. 2, there is a detailed block diagram illustrating an exemplary processor in which a preferred embodiment of the present invention may be implemented. As shown, processor 102 contains an instruction pipeline including an instruction sequencing unit (ISU) 200 and a number of execution units 208, 212, 214, 218, and 220. ISU 200 fetches instructions for processing from an L1 I-cache 206 utilizing real addresses obtained by the effective-to-real address translation (ERAT) performed by instruction memory management unit (IMMU) 204. Of course, if the requested cache line of instructions does not reside in L1 I-cache 206, then ISU 200 requests the relevant cache line of instructions from L2 cache 234 via I-cache reload bus 207, which is also coupled to a pre-fetch engine 332.

After instructions are fetched and pre-processing, if any, is performed, ISU 300 dispatches instructions, possibly out-of-order, to execution units 208, 212, 214, 218, and 220 via instruction bus 209 based upon instruction type. That is, condition-register-modifying instructions and branch instructions are dispatched to condition register unit (CRU) 208 and branch execution unit (BEU) 212, respectively, fixed-point and load/store instructions are dispatched to fixed-point unit(s) (FXUs) 214 and load-store unit(s) (LSUs) 218, respectively, and floating-point instructions are dispatched to floating-point unit(s) (FPUs) 220.

After possible queuing and buffering, the instructions dispatched by ISU 200 are executed opportunistically by execution units 208, 212, 214, 218, and 220. Instruction "execution" is defined herein as the process by which logic circuits of a processor examine an instruction operation code (opcode) and associated operands, if any, and in response, move data or instructions in the data processing system (e.g., between system memory locations, between registers or buffers and memory, etc.) or perform logical or mathematical operations on the data. For memory access (i.e., load-type or store-type) instructions, execution typically includes calculation of a target effective address (EA) from instruction operands.

During execution within one of execution units 208, 212, 214, 218, and 220, an instruction may receive input operands, if any, from one or more architected and/or rename registers within a register file coupled to the execution unit. Data results of instruction execution (i.e., destination operands), if any, are similarly written to instruction-specified locations within the register files by execution units 208, 212, 214, 218, and 220. For example, FXU 214 receives input operands from and stores destination operands to a floating-point register file (FPRP) 222, and LSU 218 receives input operands from GPRF 216 and causes data to be transferred between L 1 D-cache 230 (via interconnect 217) and both GPRF 216 and FPRF 222. Similarly, when executing condition-registermodifying or condition-register-dependent instructions, CRU 208 and BEU 212 access control register file (CRF) 210, which in a preferred embodiment includes a condition register, link, register, count register, and rename registers of each. BEU 212 accesses the values of the condition, link, and count registers to resolve conditional branches to obtain a path address, which BEU 212 supplies to instruction sequencing unit 200 to initiate instruction fetching along the indicated path. After an execution unit finishes execution of an instruction, the execution unit notifies instruction sequencing unit 200, which schedules completion of instructions in program order and the commitment of data results, if any, the architected state of processing unit 102.

Still referring to FIG. 2, a preferred embodiment of the present invention preferably includes a data memory management unit (DMMU) 224. DMMU 224 translates effective addresses (EA) in program-initiated load and store operations received from LSU 218 into physical address (PA) utilized the volatile memory hierarchy comprising L1 D-cache 230, L2 cache 224, and system memory 104. DMMU 224 includes a translation lookaside buffer (TLB) 226, and a TLB pre-fetch engine 228.

TLB 226, referenced herein in more detail in conjunction with FIGS. 3 and 4A-4C, buffers copies of a subset of page table entries (PTEs), which are utilized to translate effective addresses (EAs) employed by software executing within processor 102 into physical addresses (PAs). As utilized herein, an effective address (EA) is defined as an address that identifies a memory storage location or other resource mapped to a virtual address space. A physical address (PA), on the other hand, is defined herein as an address within a physical address space that identifies a read memory storage location or other real resource.

Figure 3:
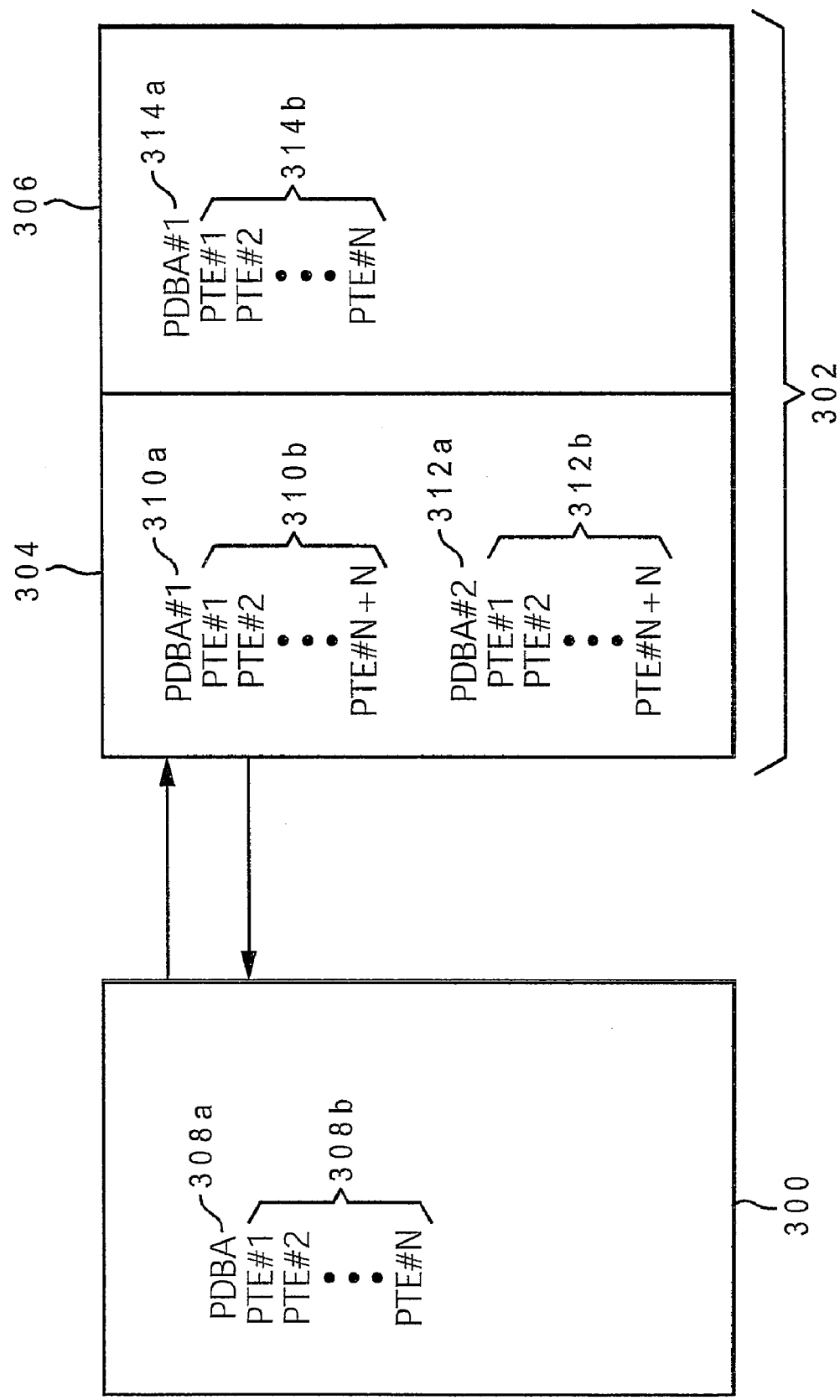
FIG. 3 is a detailed block diagram depicting a translation lookaside buffer (TLB) in an exemplary data processing system in which a preferred embodiment of the present invention may be implemented.

With reference now to FIG. 3, there is a detailed block diagram depicted an exemplary translation lookaside buffer (TLB) in which a preferred embodiment of the present invention may be implemented. As illustrated, TLB 226 is further divided into a first-level TLB 300 and a second-level TLB 302. Second-level TLB 302 is also divided into task switch directory (TSD) 304 and current running task directory (CRTD) 306.

First-level TLB 300 holds a current page directory base address (PDBA) 308a that identifies the current running task. Associated with current PDBA 308a are a collection of recently-accessed page table entries 308b retrieved from page frame table (PFT) 116. Page frame table 116, located in system memory 104, includes a set of page table entries (PTEs). As previously discussed, page table entries are utilized to translate effective addresses employed by software executing within processor 102 into physical addresses. Because processor 102 addresses memory locations utilizing effective address, processor 102 requires a page table entry to translate the effective addresses to physical addresses that actually contain the requested data or instructions.

Therefore, first-level TLB 300 caches recently referenced page table entries for easy future access by processor 102. Preferably utilizing a least-recently used algorithm, first-level TLB 300 evicts least-recently used page table entries to current running task directory 306 of second-level TLB 302, if second-level TLB 302 determines that the page table entry was not evicted due to a task switch, discussed later in more detail in conjunction with FIGS. 4A-4C. Therefore, if processor 102 requests a page table entry that is not found in first-level TLB 300, processor 102 then references current running task directory 306 in second-level TLB 302. Also, as illustrated, current running task directory 306 also includes a current page directory base address 314a and associated page table entries 314b. Page table entries 314b are page table entries that have been evicted from first-level TLB 300 via a least-recently used or other algorithm.

As previously discussed, second-level TLB 302 also includes a task switch directory (TSD) 304. Task switch directory 304 includes a collection of page directory base addresses 310a and 312b and associated page table entries 310b and 312b. During data processing system 100 operation, if second-level TLB 302 determines that a task switch has occurred, first-level TLB 300 sends a page directory base address 308a and all related page table entries 308b to task switch directory 304. Then, first-level TLB 300 searches the contents of task switch directory for a page directory base address (PDBA) that corresponds to the new task. If first-level TLB 300 locates a page directory base address (PDBA) that corresponds to the new task, first-level TLB 300 loads all page table entries (PTEs) stored in task switch directory 304 corresponding to the found page directory base address (PDBA).

Figure 4A:
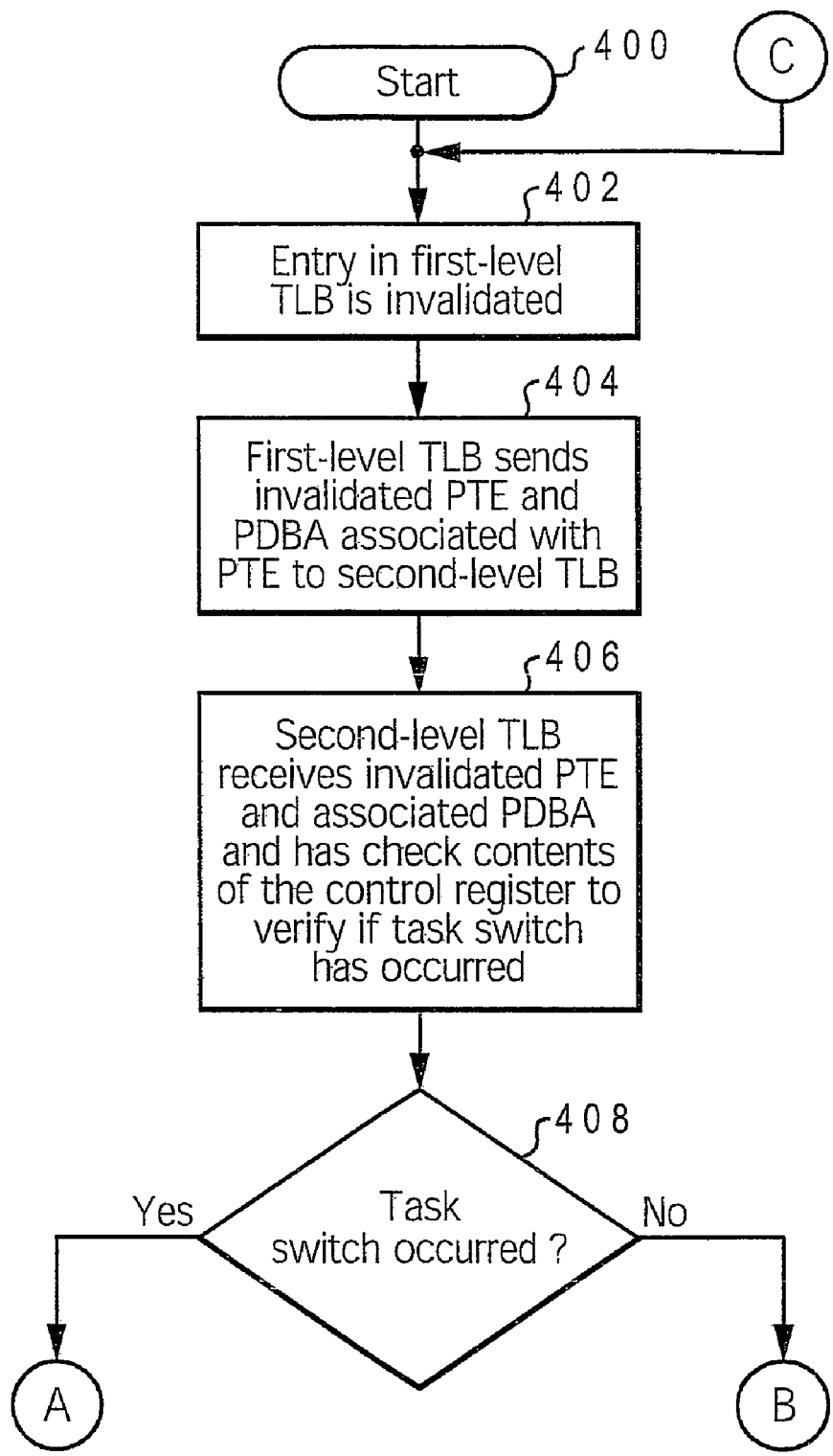
FIG. 4A is a high-level logical flowchart illustrating an invalidation phase and task switch determination phase of a method of improve task switching according to a preferred embodiment of the present invention.

Referring now to FIG. 4A, there is a high-level logical flowchart illustrating an invalidation phase and task switch determination phase of a preferred method of improved task switching according to a preferred embodiment of the present invention.

Invalidation Phase:

Typically, when processor 102 requires an effective-to-physical address translation, processor 102 references a page table entry to make the translation. Due to the sheer number of page table entries, page frame table 116 stores all of the page table entries in system memory 104. However, since the time required to access system memory 104 is much greater than a processor cycle, processor 102 would stall (e.g., not do any useful work) for multiple processor cycles while waiting for the retrieval of a page table entry from page frame table 116 located in system memory 104. Therefore, in order to mask this memory access time latency, recently-accessed page table entries are stored in a translation lookaside buffer (TLB) 226 for local access by processor 102. As previously discussed, TLB 226 is further divided into a first-level TLB 300 and a second-level TLB 302. First-level TLB 300 stores recently-accessed page table entries that correspond to the current-running task. Since first-level TLB 300 can only store a limited number of entries, older page table entries are invalidated and evicted from first-level TLB 300 into second-level TLB 302, as illustrated by blocks 400, 402, 404, and 406. A least-recently used algorithm or any other algorithm may be utilized to identify, invalidate, and evict older page table entries.

Task Switch Determination Phase:

The task switch determination phase includes second-level TLB 302 determining whether the invalidation and eviction of a page table entry was due to a task switch. An older page table entry can be invalidated for other reasons besides the result of a calculation of a least-recently used algorithm. For example, tasks in data processing systems are usually related to certain sets of page table entries. Therefore, if processor 102 references first-level TLB 300 and cannot locate a requested page table entry, this may be the result of a task switch. As depicted by block 408, once first-level TLB 300 evicts an older page table entry, second-level TLB 302 determines whether or not his eviction was the result of a task switch. Typically, second-level TLB 302 references the page directory base address associated with the evicted page table entry and compares it with the page directory base address stored in a control register. If the page directory base addresses match, a task switch has not occurred and the process proceeds to marker B, which connects to the high-level logical flowchart depicted in FIG. 4C. On the other hand, if the page directory base addresses do not match, a task switch has occurred and the process continues to marker A, which connects to the high-level logical flowchart depicted in FIG. 4B.

Figure 4B:
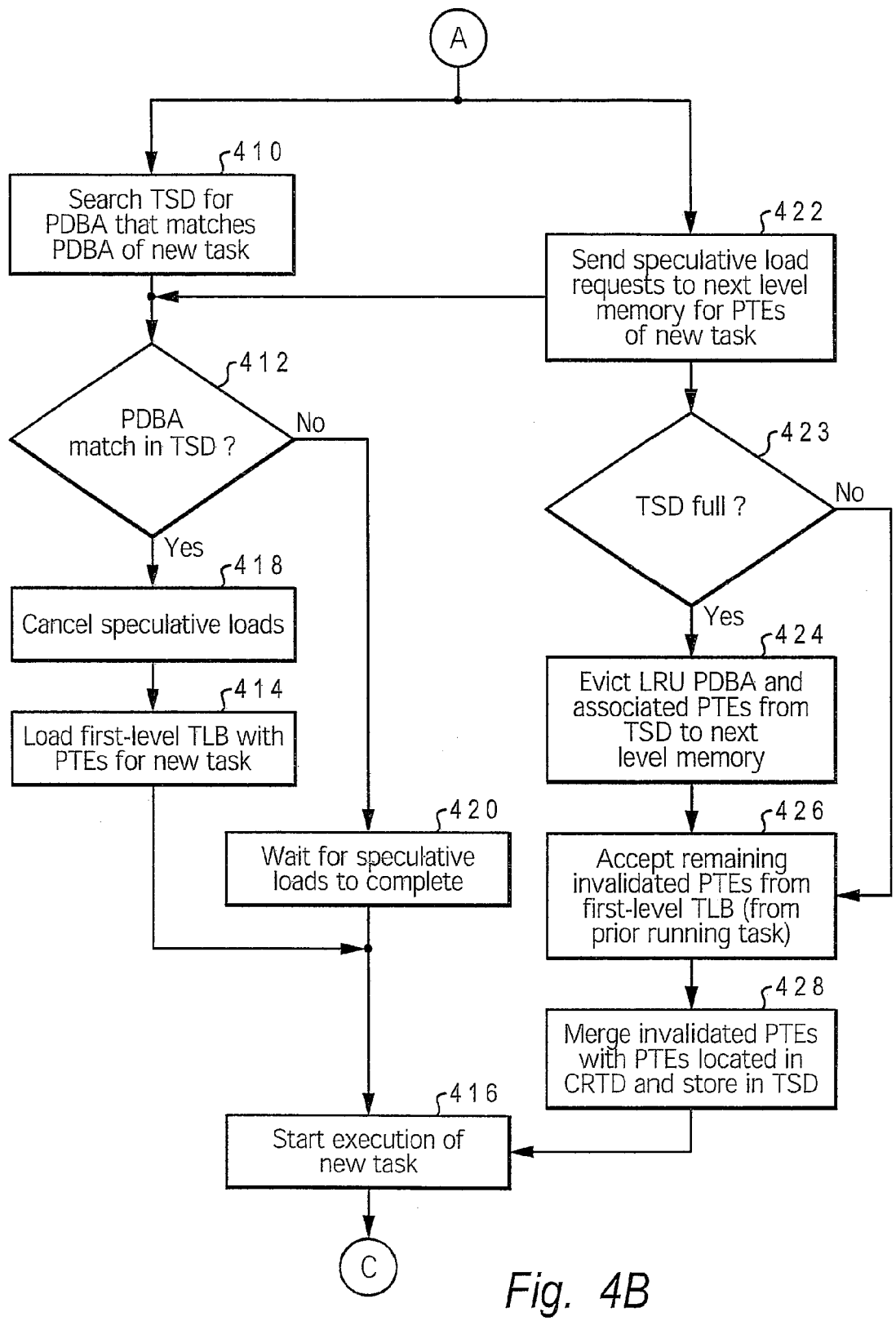
FIG. 4B is a high-level logical flowchart depicting a task switch phase of a method of improved task switching according to a preferred embodiment of the present invention.

Referring now to FIG. 4B, there is illustrated a high-level logical flowchart depicting a task switch phase of a method of improved task switching according to a preferred embodiment of the present invention.

Task Switch Phase:

If second-level TLB 302 determines that a task switch has occurred, this determination initiates two processes. Those with skill in this art will appreciate that these processes may run sequentially or in parallel.

Task Switch Phase—Process 1:

The first process involves first-level TLB 300 searching task switch directory 304 for a page directory base address and associated page table entries corresponding to the new task, as illustrated by blocks 410 and 412. If the search is successful, first-level TLB 300 cancels requested speculative loads performed by pre-fetch engine 232, as depicted in block 418. The requested speculative loads are discussed in more detail in conjunction with task switch phase—process 2. Also, as illustrated in blocks 414 and 416, first-level TLB 300 loads the associated page table entries and starts execution of the new task. If, however, the search is unsuccessful, first-level TLB 300 will wait for the requested speculative loads to complete and then begin execution of the new task, as illustrated in blocks 420 and 416. Then, the process continues to marker C, indicates that the process returns to block 402 of FIG. 4A and continues in an iterative fashion.

Task Switch Phase—Process 2:

The second process involves pre-fetch engine 232 speculatively retrieving a set of page table entries from page frame table 116 in system memory 104, as illustrated in block 422. If the search of task switch directory 304 referenced in process 1 is successful, the pre-fetch engine's 232 speculative loads are cancelled and processor 102 continues running the newly-loaded task, as depicted in blocks 418 and 414. However, if the search of the task switch directory referenced in the first process is not successful, first-level TLB 300 waits for the speculative loads to complete before continuing the processing of the new task, as illustrated in blocks 420 and 416. Then, as previously discussed, the process continues to marker C and proceeds in an iterative fashion.

Also, process 2 includes merging page table entries from first-level TLB 300 and current-running task directory 306 for storage in task switch directory 304. First, a determination is made as to whether task switch directory 304 is full, as illustrated in block 423. Then, if task switch directory 304 is determined to be full, task switch directory 304 evicts a page directory base address (which corresponds to a task) and a set of associated page table entries to system memory 104, as illustrated in block 424. A least-recently used algorithm or any other algorithm may be utilized by task switch directory to determine which page directory base address should be evicted. Then, all page table entries stored in first-level TLB 300 are merged with the page table entries stored in current running task directory 306 and the merged list is stored in task switch directory 304, as illustrated by blocks 426 and 428. Then, processor 102 begins processing of the new task, as depicted in block 416. If, however, if task switch directory 304 is determined to not be full, there is no need for the eviction of a currently stored page directory base address and the associated page table entries. Instead, task switch directory 304 merely accepts the remaining invalidated page table entries from first-level TLB 300 and merges the invalidated page table entries with page table entries located in current running task directory 306 and stores the merged list in task switch directory 306, as illustrated in blocks 426 and 428. The, processor 102 starts execution of the newly-loaded task (block 416) and the process transitions to marker C, where the process proceeds in an iterative fashion.

Figure 4C:
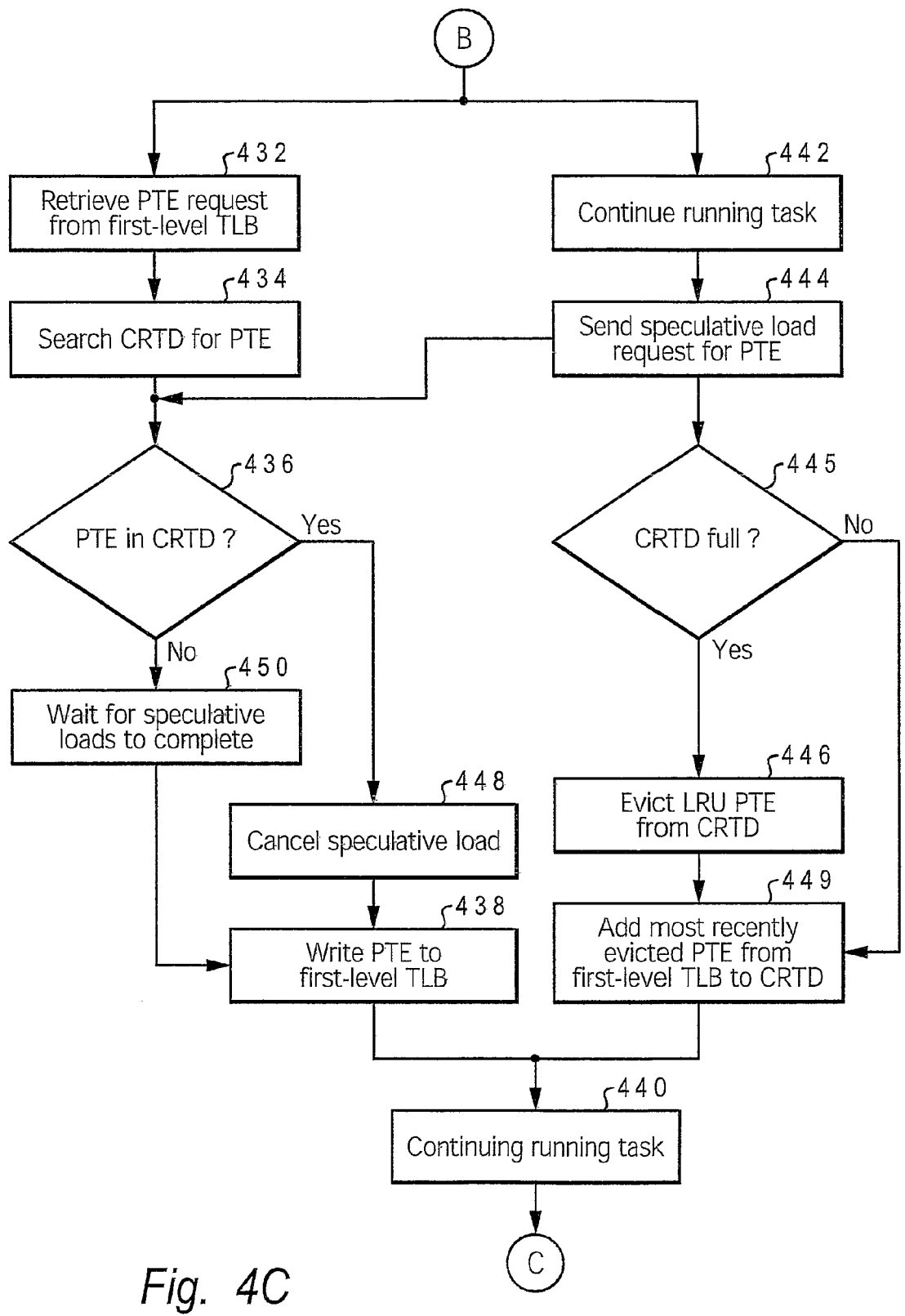
FIG. 4C is a high-level logical flowchart depicting a least-recently used page table entry phase of a method of improved task switching according to a preferred embodiment of the present invention.

With reference now to FIG. 4C, there is depicted a least-recently used page table entry eviction phase of a preferred method of improved task switching according to a preferred embodiment of the present invention.

Least-Recently Used Page Table Entry Eviction Phase:

If second-level TLB 302 determines that a task switch has not occurred, this determination initiates two processes. Those with skill in this art will appreciate that these processes may run sequentially or in parallel.

Least-Recently Used Page Table Entry Eviction Phase—Process 1:

The first process involves current running task directory 306 in second-level TLB 302 receiving a page table entry request from first-level TLB 300 and determining if the requested page table entry is stored in current running task directory 306, as illustrated in blocks 432 and 434. If the requested page table entry is stored in current running task directory 306, as depicted in block 436, first-level TLB 300 cancels a speculative load instigated by pre-fetch engine 232, as depicted in block 448. The speculative load will be discussed in more detail with least-recently used page table entry eviction phase—process 2. Then, first-level TLB 300 loads the requested page table entry, as illustrated in block 438, and continues processing of the current task, as depicted in block 440. Then, the process transitions to marker C and proceeds in an iterative fashion.

However, if the requested page table entry is not stored in current running task directory 306, processor 102 waits for the speculative loads addressed below in process 2 to complete and first-level TLB 300 loads the requested page table entry, as depicted in blocks 450 and 438. Then, processor 102 continues running the task (block 440). The process then transitions to marker C and continues in an iterative fashion.

Least-Recently Used Page Table Entry Eviction Phase—Process 2:

The second process involves processor 102 continuing the processing of the current task, as illustrated in block 442. Also, in response to a speculative load request, pre-fetch engine 232 speculatively retrieves the requested page table entry from page frame table 116 in system memory 104, as illustrated in block 444. If the search of current running task directory 306 in the process 1 is successful, the pre-fetch engine 232 cancels the speculative loads from the current running task directory 306 and first-level TLB 300 loads the requested page table entry, as depicted in blocks 448 and 438. Then data processing system 100 continues processing of the current task and returns to the beginning of the process, as illustrated by block 440 and marker C.

However, if the search of the task switch directory referenced in the first process is not successful, first-level TLB 300 waits for the speculative loads to complete before loading the requested page table entry into first-level TLB 300 and continuing the processing of the current-running task, as depicted in blocks 450, 438, and 440.

Also, a determination of the status of current running task directory 306 must be made, as illustrated in block 445. If current running task directory 304 is full, a page table entry is evicted to free memory to accommodate a most recently-evicted page table entry from first-level TLB 300, as illustrated in blocks 446 and 449. Then, the process continues to marker C and proceeds in an iterative fashion. However, if current running task directory 304 is not full, the most recently evicted page table entry from first-level TLB 300 is written to current running task directory 304. The process then continues to marker C and proceeds in an iterative fashion.

Although the flow diagrams depicted in FIG. 4 indicate a particular order of operation and a specific granularity of process operations, in alternative embodiments the illustrated order may be varied (e.g., process operations may be performed in another order or performed substantially in parallel) and one or more of the process operations may be coalesced or fragmented. Similarly, additional process operations may be added where necessary in alternative embodiments of the present invention.

As disclosed, the present invention is a system and method of improved task switching and page translation performance within a data processing system. After a first-level translation lookaside buffer (TLB) invalidates a page table entry, a second-level TLB determines whether or not the invalidation of the page table entry was a result of a task switch. If the second-level TLB determines that the invalidation of the page table entry was the result of a task switch, the second-level TLB searches a task switch directory for a page directory base address corresponding to the newly-switched task and associated page table entries. If second-level TLB locates the page directory base address, the associated page table entries are loaded into the first-level TLB for local access by the processor. Therefore, the processor would not have to query a page frame table located in system memory for the required page table entries to perform effective-to-physical address translation. If the second-level TLB determines that the invalidation of the page table entry was not the result of a task switch, the first-level TLB evicts the invalidated page table entry to a current running task directory.

While this invention has been particularly shown as described with reference to a preferred embodiment, it will be understood by those skilled in this art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of such signal-bearing media include, without limitation, recordable-type media such as floppy disks or CD-ROMs and transmission-type media such as analog or digital communication links.

What is claimed is:

1. A data processing system, comprising:
a system memory, including a page table; and
a processor, coupled to said system memory via an interconnect, wherein said processor further includes:
a translation lookaside buffer (TLB) that determines whether a task switch has occurred, wherein the TLB includes:
a first-level cache memory that casts out an invalidated page table entry and associated first page directory base address; and
a second-level cache memory coupled to said first-level cache memory, wherein said second-level cache memory includes a second-level cache directory including:
a current-running task directory associated with a first task for storing at least one page table entry evicted from said first-level cache memory;
a task switch directory for storing at least one plurality of page table entries associated with at least one other task and sending a first plurality of page table entries associated with a new task to enable improved task switching without requiring access to said page table stored in said system memory to retrieve said first plurality of page table entries.

2. The data processing system according to claim 1, wherein said second-level cache directory sends at least one speculative load request to said system memory for a second plurality of page table entries related to said new task, in response to determining said task switch has occurred.

3. The data processing system according to claim 2, wherein said second-level cache directory parses said task switch directory for a second page directory base address associated with said new task, in response to determining said task switch has occurred and loads said second plurality of page table entries related to said new task, in response to determining said task switch does not include said second page directory base address.

4. The data processing system according to claim 1, wherein said processor starts executing said new task, in response to loading said first plurality of page table entries.

5. The data processing system according to claim 1, wherein said second-level cache directory determines whether said task switch directory is full and in response to determining said task switch directory is full, casts out a page directory base address and a plurality of associated page table entries from said task switch directory, and merges into a list a plurality of page table entries from said first-level cache memory with a plurality of page table entries stored in said current-running task directory, and stores said list in said task switch directory.

6. The data processing system according to claim 1, wherein said second-level cache directory determines whether a requested page table entry is stored in said current-running task directory, in response to determining said task switch has not occurred.

7. The data processing system according to claim 1 wherein said second-level cache directory sends a speculative load request for a requested page table entry, in response to determining said task switch has not occurred.

8. The data processing system according to claim 1, wherein said second-level cache directory evicts a page table entry from said current-running task directory, in response to determining said task switch has not occurred, and adds said invalidated page table entry to said current-running task directory, in response to. evicting said page table entry from said current running task directory.

9. A processor, comprising:
a translation lookaside buffer (TLB) that determines whether a task switch has occurred, wherein the TLB includes:
a first-level cache memory that casts out an invalidated page table entry and associated first page directory base address; and
a second-level cache memory coupled to said first-level cache memory, wherein said second-level cache memory includes a second-level cache directory including:

a current-running task directory associated with a first task for storing at least one page table entry evicted from said first-level cache memory;

a task switch directory for storing at least one plurality of page table entries associated with at least one other task and sending a first plurality of page table entries associated with a new task to enable improved task switching without requiring access to said page table stored in a system memory to retrieve said first plurality of page table entries.

10. The processor of claim 9, wherein said second-level cache directory sends at least one speculative load request to said system memory for a second plurality of page table entries related to said new task, in response to determining said task switch has occurred.

11. The processor of claim 10, wherein said second-level cache directory parses said task switch directory for a second page directory base address associated with said new task, in response to, determining said task switch has occurred and loads said second plurality of page table entries related to said new task, in response to determining said task switch does not include said second page directory base address.

12. The processor of claim 9, wherein said processor starts executing said new task, in response to loading said first plurality of page table entries.

13. The processor of claim 9, wherein said second-level cache directory determines whether said task switch directory is full and in response to determining said task switch directory is full, casts out a page directory base address and a plurality of associated page table entries from said task switch directory, and merges into a list a plurality of page table entries from said first-level cache memory with a plurality of page table entries stored in said current running task directory, and stores said list in said task switch directory.

14. The processor of claim 9, wherein said second-level cache directory determines whether a requested page table entry is stored in said current-running task directory, in response to determining said task switch has not occurred.

15. The processor of claim 9, wherein said second-level cache directory sends a speculative load request for a requested page table entry, in response to determining said task switch has not occurred.

16. The processor of claim 9, wherein said second-level cache directory evicts a page table entry from said current-running task directory, in response to determining said task switch has not occurred, and adds said invalidated page table entry to said current-running task directory, in response to evicting said page table entry from said current-running task directory.

17. A computer program product for improved task switching in a data processing system, said computer program product comprising:

a computer readable storage media;

first program instructions for casting out an invalidated page table entry and: associated first page directory base address from a first-level cache memory to a second-level cache memory;

second program instructions for, in response to said casting out, determining, whether a task switch has occurred;

third program instructions for, in response to determining a task switch has not occurred, sending said invalidated page table entry to a current running task directory; and fourth program instructions for, in response to determining said task switch has occurred, loading from a task switch directory a first plurality of page table entries related to a new task to enable improved task switching without requiring access to a page table stored in main memory to retrieve said first plurality of page table entries; and wherein said first, second, third and fourth program instructions are stored on said computer readable storage media.

18. The computer program product according to claim 17, further comprising:

fifth program instructions for, in response to determining said task switch has occurred, sending at least one speculative load request to a system memory for a second plurality of page table entries related to said new task; and wherein said fifth program instructions are stored on said computer readable storage media.

19. The computer program product according to claim 18, further comprising:

sixth program instructions for, in response to determining said task switch has occurred, parsing said task switch directory for a second page directory base address associated with said new task; and seventh program instructions for, in response to determining said task switch directory does not include said second page directory base address, loading said second plurality of page table entries related to said new task; and wherein said sixth and seventh program instructions are stored on said computer readable storage media.

20. The computer program product according to claim 18, further comprising:

sixth program instructions for, in response to said loading, starting execution of said new task; and wherein said sixth program instructions are stored on said computer readable storage media.

21. The computer program product according to claim 17, further comprising:

fifth program instructions for determining whether said task switch directory is full;

sixth program instructions for, in response to determining said task switch directory is full, casting out a page directory base address and a plurality of associated page table entries from said task switch directory; and seventh program instructions for merging into a list a plurality of page table entries from said first-level cache memory with a plurality of page table entries stored in said current-running task directory; and eighth program instructions for storing said list in said task switch directory; and wherein said fifth, sixth, seventh and eighth program instructions are stored on said computer readable storage media.

22. The computer program product according to claim 17, further comprising:

fifth program instructions for, in response to determining said task switch has not occurred, determining whether a requested page table entry is stored in said current-running task directory; and wherein said fifth program instructions are stored on said computer readable storage media.

23. The computer program product according to claim 17, further including comprising:

fifth program instructions for, in response to determining said task switch has not occurred, sending a speculative load request for a requested page table entry; and wherein said fifth program instructions are stored on said computer readable storage media.

24. The computer ,program product according to claim 17, further comprising:

fifth program instructions for, in response to determining said task switch has not occurred, evicting a page table entry from said current-running task directory; and sixth program instructions for, in response to said evicting, adding said invalidated page table entry to said current-running task directory; and wherein said fifth and sixth program instructions are stored on said computer readable storage media.

* * * * *